US012683410B2

(12) United States Patent
Dhanasekaran et al.

(10) Patent No.: US 12,683,410 B2
(45) Date of Patent: Jul. 14, 2026

(54) NEGATIVE TRANSIENT VOLTAGE SUPPRESSION IN A WIRELESS COMMUNICATION DEVICE

(71) Applicant: QUALCOMM Incorporated, San Diego, CA (US)

(72) Inventors: Vijayakumar Dhanasekaran, San Diego, CA (US); Ramkumar Sivakumar, San Diego, CA (US); Kshitij Yadav, San Diego, CA (US); Khaled Mahmoud Abdelfattah Aly, Irvine, CA (US)

(73) Assignee: Qualcomm Incorporated, San Diego, CA (US)

( * ) Notice: Subject to any disclaimer, the term of this patent is extended or adjusted under 35 U.S.C. 154(b) by 896 days.

(21) Appl. No.: 18/055,306

(22) Filed: Nov. 14, 2022

(65) Prior Publication Data

US 2024/0162718 A1 May 16, 2024

(51) Int. Cl.
*H02J 7/42* (2026.01)
*H02J 7/64* (2026.01)

(52) U.S. Cl.
CPC . *H02J 7/42* (2026.01); *H02J 7/64* (2026.01)

(58) Field of Classification Search
CPC ......... H10K 2102/3026; H10K 59/126; H10K 59/13; H10K 59/40; H10K 59/60; H10K 65/00; H03F 1/52; H03F 2200/03; H03F 2200/441; H03F 2200/444; H03F 3/187; H03F 3/19; H03F 3/2171; H03F 3/2173; H03F 3/68

USPC .................. 381/312, 123, 120, 1–3; 700/94; 320/108
See application file for complete search history.

(56) References Cited

U.S. PATENT DOCUMENTS

| | | | | |
|---|---|---|---|---|
| 4,260,892 | A * | 4/1981 | Kovacs | G01T 1/18 |
| | | | | 250/374 |
| 4,301,490 | A * | 11/1981 | Nagel | H03F 1/52 |
| | | | | 361/100 |
| 6,775,112 | B1 * | 8/2004 | Smith | G05F 1/613 |
| | | | | 361/111 |
| 2018/0374705 | A1 * | 12/2018 | Dhanasekaran | H02H 9/04 |
| 2021/0124383 | A1 * | 4/2021 | Iguchi | G05F 1/565 |
| 2021/0367383 | A1 | 11/2021 | Dhanasekaran | |

FOREIGN PATENT DOCUMENTS

EP          4044441 A1      8/2022

OTHER PUBLICATIONS

International Search Report and Written Opinion—PCT/US2023/036691—ISA/EPO—Mar. 11, 2024.

(Continued)

*Primary Examiner* — Lun-See Lao
(74) *Attorney, Agent, or Firm* — Gerald P. Joyce, III

(57) ABSTRACT

Circuits and methods for suppression of negative transient voltage may be implemented in systems that combine high-speed data, audio, and charging at a plug. The circuits and methods for suppression of the negative transient voltage may include a first diode and transistor coupled in series between a pin and ground, where the transistor is controlled by an output of a voltage comparator that is also coupled to the first pin. A negative transient voltage event may cause the comparator to activate the transistor to sink a current through the diode.

16 Claims, 5 Drawing Sheets

(56)          References Cited

OTHER PUBLICATIONS

Wang C.C., et al., "A 60 V Tolerance Transceiver With ESD
Protection for FlexRay-Based Communication Systems", IEEE
Transactions on Circuits and Systems I: Regular Papers, IEEE, US,
vol. 62, No. 3, Feb. 23, 2015, pp. 752-760, XP011573827, p. 752,
Left-hand column, line 22—p. 759, Right-hand column, line 4,
Figures 1-22.

* cited by examiner

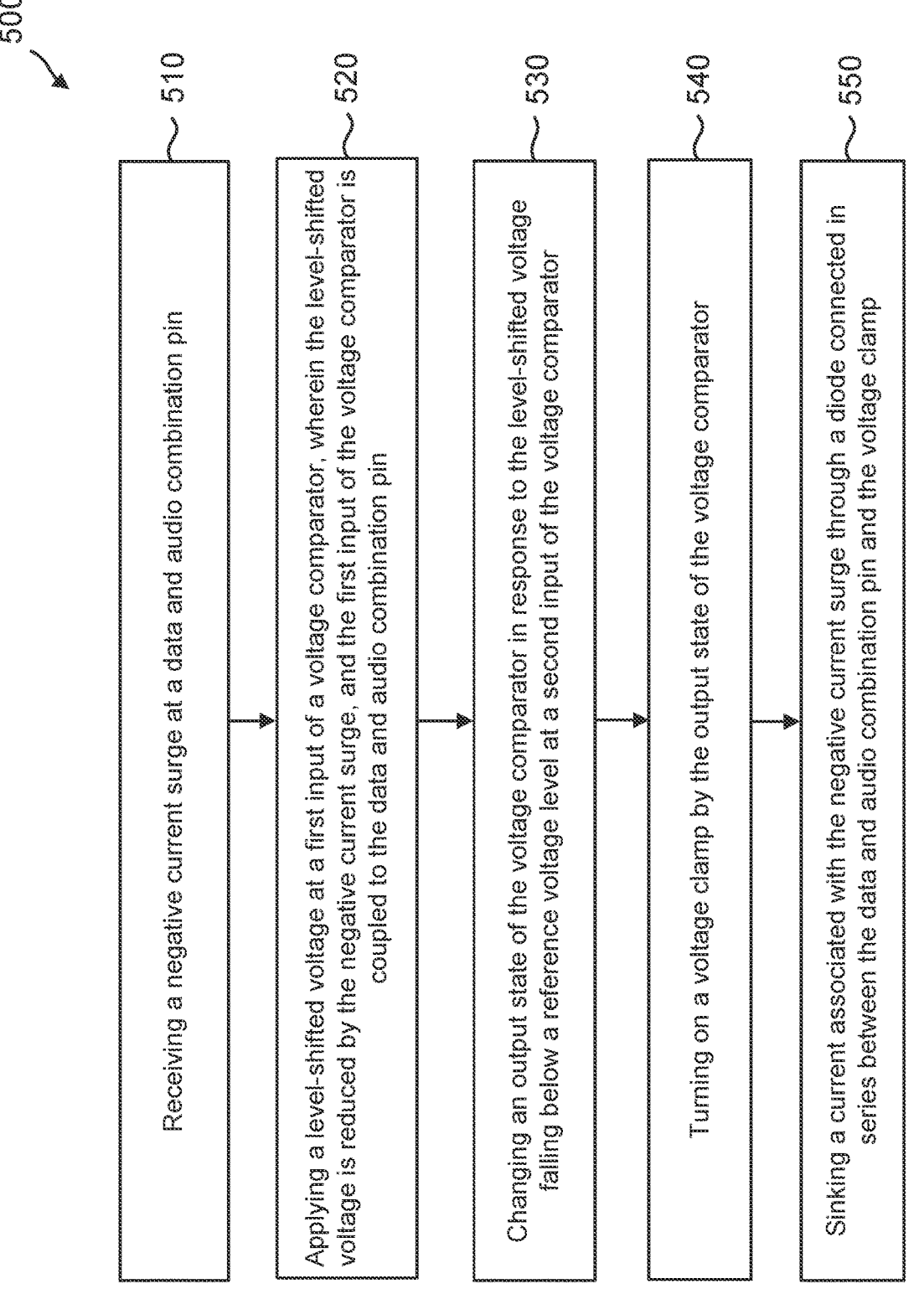

500

510 Receiving a negative current surge at a data and audio combination pin

520 Applying a level-shifted voltage at a first input of a voltage comparator, wherein the level-shifted voltage is reduced by the negative current surge, and the first input of the voltage comparator is coupled to the data and audio combination pin 530 Changing an output state of the voltage comparator in response to the level-shifted voltage falling below a reference voltage level at a second input of the voltage comparator 540 Turning on a voltage clamp by the output state of the voltage comparator 550 Sinking a current associated with the negative current surge through a diode connected in series between the data and audio combination pin and the voltage clamp

FIG. 5

NEGATIVE TRANSIENT VOLTAGE SUPPRESSION IN A WIRELESS COMMUNICATION DEVICE

TECHNICAL FIELD

This application relates to transient voltage suppression, and more particularly to negative transient voltage protection in wireless communication devices.

BACKGROUND

Some wireless communication devices (e.g., smart phones) are moving toward having a single input for both high-speed data, direct current (DC) charging, and analog audio signals. However, sharing responsibilities of data, audio, and DC charging at a single input may create the possibility of voltage surges with the potential to harm internal circuitry. For instance, IEC-61000-4-5 puts constraints on reliability of a connector pin and, hence, the response time of detection circuitry to respond to high-voltage events that may affect that connector pin. However, another constraint for some wireless communication devices is low distortion, so using large transistors to dissipate a voltage surge may be prohibitive in some applications that would be affected by capacitance of those large transistors.

There is a need in the art for voltage suppression circuits with increased performance and reduced capacitance.

SUMMARY

In one implementation, a wireless communication device includes an application processor; an audio signal amplifier; a charging integrated circuit, where the application processor, the audio signal amplifier, and the charging integrated circuit are coupled to a set of wires by multiplexing circuitry; a first pin on a first wire of the set of wires; a data and charging plug coupled to the set of wires through the first pin; a first voltage comparator having an inverting input coupled to the first pin, where a non-inverting input of the first voltage comparator is coupled to a reference voltage; and a first diode and a transistor coupled in series between the first pin and ground, where a gate of the transistor is coupled to an output of the first voltage comparator.

In another implementation, a method of operating a transient voltage suppression circuit includes receiving a negative current surge at a data and audio combination pin; applying a level-shifted voltage at a first input of a voltage comparator, where the level-shifted voltage is reduced by the negative current surge, further where the first input of the voltage comparator is coupled to the data and audio combination pin; changing an output state of the voltage comparator in response to the level-shifted voltage falling below a reference voltage level at a second input of the voltage comparator; turning on a voltage clamp by the output state of the voltage comparator; and sinking a current associated with the negative current surge through a diode coupled in series between the data and audio combination pin and the voltage clamp.

In another implementation, a wireless communication device includes an application processor; an audio signal amplifier; a charging integrated circuit; means for multiplexing the application processor, the audio signal amplifier, and the charging integrated circuit on a set of wires; a first pin on a first wire of the set of wires; a data and charging plug coupled to the set of wires through the first pin; and means for canceling a negative surge at the first pin, where the means for canceling includes a first diode and shunt transistor coupled in series between ground and the first pin.

In yet another implementation, a wireless communication device includes a first chip and an audio signal amplifier coupled to a set of wires through multiplexing circuitry; a first pin on the set of wires, where the first pin is coupled to a combination data and audio plug; a coder decoder (codec) chip including the set of wires and the multiplexing circuitry; an electrostatic discharge (ESD) protection feedback loop, where the ESD protection feedback loop couples the first pin to a first input of a first comparator and couples an output of the first comparator to a gate of a shunt transistor, where the shunt transistor is coupled in series between a first diode and ground.

These and additional advantages may be better appreciated through the following detailed description.

BRIEF DESCRIPTION OF THE DRAWINGS

FIG. 5 illustrates a flowchart of an example method that may be performed by the circuits of FIGS. 2-4.

Implementations of the present disclosure and their advantages are best understood by referring to the detailed description that follows. It should be appreciated that like reference numerals are used to identify like elements illustrated in one or more of the figures.

DETAILED DESCRIPTION

Figure 1:
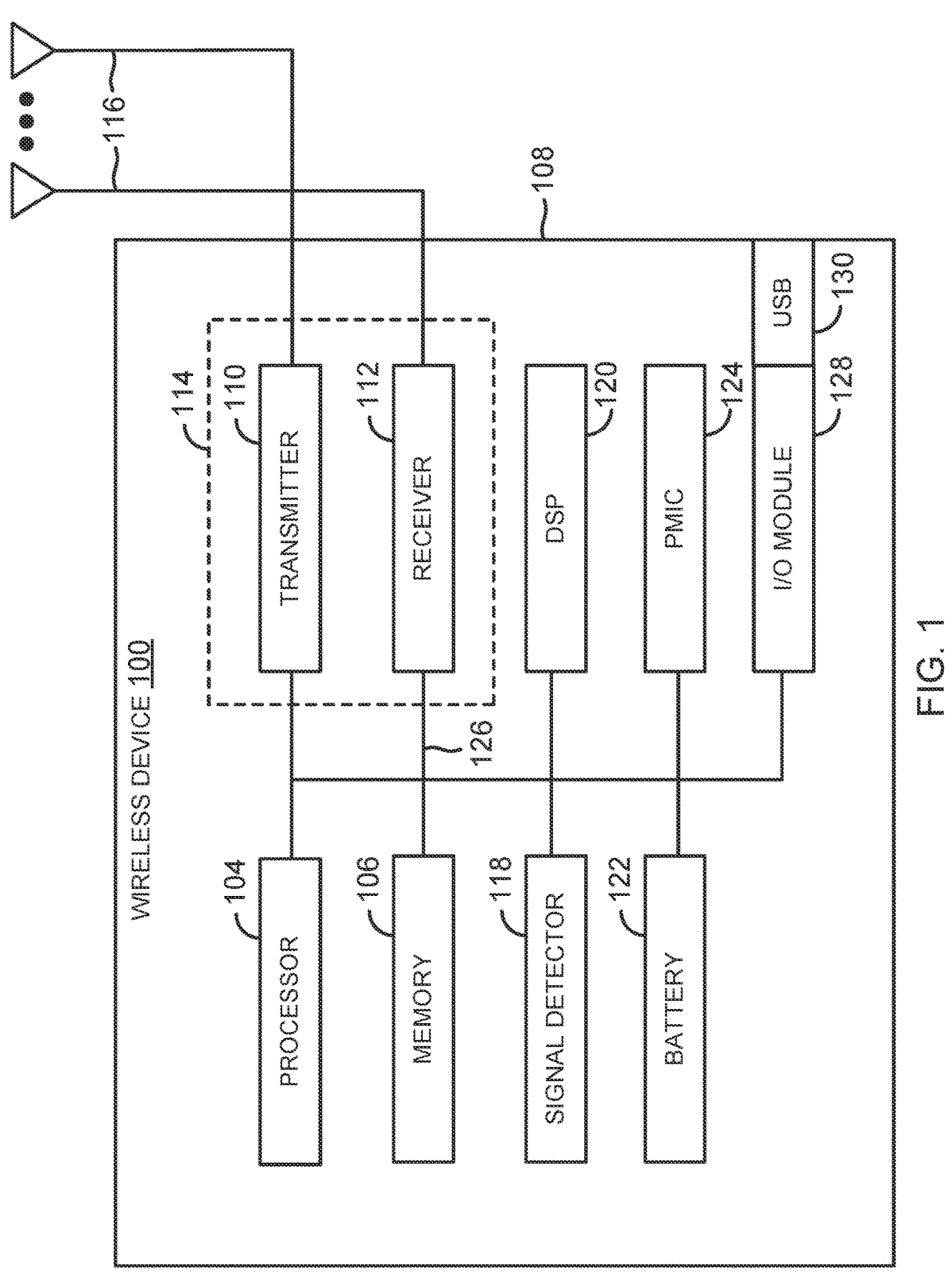
FIG. 1 illustrates a illustrates a block diagram of an example wireless device that includes a circuit for negative voltage transient suppression, according to one implementation.

In one example, a wireless device includes a Universal Serial Bus (USB) Type-C (USB-C) receptacle that is used for charging, for high-speed data, and for analog audio signals. For instance, the device may omit a 3.5 mm audio jack in favor of using a USB-C receptacle for physical attachment of a headset or earbuds. An advantage of such devices is that they may use a single chip for USB-C and audio, thereby saving area inside the housing of the device.

A disadvantage of using a USB-C receptacle for analog audio is that a physical pin on the set of wires, which is coupled to charging hardware, data hardware, and audio amplifiers, may be subject to overvoltage phenomena, such as negative surge due to negative transient voltage. Specifically, relatively long cables, such as may be associated with USB or audio cables, may build static charge. When a cable is plugged in to a device, that static charge may then discharge to the device.

One solution to handle negative surge is to employ a shunt clamp device; however, a shunt clamp device may be relatively large to handle the size of currents that might be expected. For instance, one solution includes sizing the shunt device as a transistor that has a width of 4 mm per each amp of surge. For a device that would be expected to handle up to 6 A, the transistor would have a width of about 24 mm. The capacitance attributable to a 24 mm transistor would be expected to be quite large, enough to reduce the bandwidth of the high-speed data connection substantially. Various implementations herein provide effective negative surge protection while reducing an amount of capacitance.

In one example, a wireless communication device includes an application processor, an audio signal amplifier, and a charging integrated circuit (IC) coupled to a set of wires by multiplexing circuitry. The first set of wires may include a pin, and a data and charging plug is coupled to the set of wires through the pin. The implementation provides negative surge protection at the pin to reduce harmful voltages and currents that might be seen at the application processor, audio signal amplifier, charging integrated circuit, or codec chip coupled to the wires.

Continuing with the example, a voltage protection circuit includes a first voltage comparator. The inverting input of the comparator is coupled to the first pin, and a non-inverting input is coupled to a reference voltage. The reference voltage is selected so that when a voltage level at the inverting input drops below the reference voltage, the comparator outputs a signal that turns on a shunt transistor.

The voltage protection circuit may include the shunt transistor (mentioned above) as well as a diode. The shunt transistor and the diode may be placed in series with ground. The gate of the shunt transistor is coupled to the output of the comparator.

In one example use case, a negative surge may cause a voltage at the pin to drop, thereby causing the voltage level at the inverting input of the comparator to drop and causing the output of the comparator to change states. When the output of the comparator changes states, the output voltage level of the comparator turns on the shunt transistor, which allows current to flow from ground to the pin and cancels the negative surge.

The diode may be implemented to have a low capacitance. For instance, the diode may be implemented as a positive-negative (p-n) junction device, rather than as a metal oxide semiconductor field effect transistor (MOSFET) transistor connected in a diode arrangement. The physics of a p-n junction device allow a smaller device with a lower capacitance to sink a given amount of current, whereas a MOSFET transistor would generally be expected to be much larger to sink the same amount of current. The combined series capacitance of the low-capacitance diode and the high-capacitance shunt transistor is lower than the capacitance of the high-capacitance shunt transistor. In some instances, the capacitance of the diode may be designed to be much lower (e.g., greater than one order of magnitude) than the capacitance of the shunt transistor so that the combined capacitance is much closer to the capacitance of the diode than to the capacitance of the shunt transistor.

In other words, various implementations may be designed to provide effective protection for negative surge while also reducing an amount of capacitance seen at the pin from the voltage protection device. Lower capacitance may lead to less distortion and, thus, higher bandwidth on the wires.

FIG. 1 illustrates an example device 100 in which aspects of the present disclosure may be implemented. The device 100 may be a battery-operated device such as a cellular phone, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as direct current (DC)-to-DC conversion, battery charging, power-source selection, voltage scaling, power sequencing, etc. In certain aspects, the PMIC 124 may include a battery charging circuit (e.g., a master-slave battery charging circuit) or other switched-mode power supply. The various components of the device 100 may be coupled together by a bus system 126, which may include a power bus, a control signal bus, and/or a status signal bus in addition to a data bus.

For certain aspects, the device 100 may have an input/output (I/O) module 128 for receiving and/or outputting data and/or power. In certain aspects, the I/O module 128 may include a connector 130, such as a USB Type-A (USB-A) receptacle or a USB-C receptacle. The pins of the connector 130 may be routed to the processor 104 and/or the PMIC 124 via signal lines of the bus system 126 and/or the I/O module 128, at least some of which may include an overvoltage protection circuit, as further described herein. Also, as described herein, the I/O module 128 may include a coder decoder (codec) chip, the codec chip including an audio signal path and drivers, among other hardware components, to facilitate audio through the connector 130.

Figure 2:
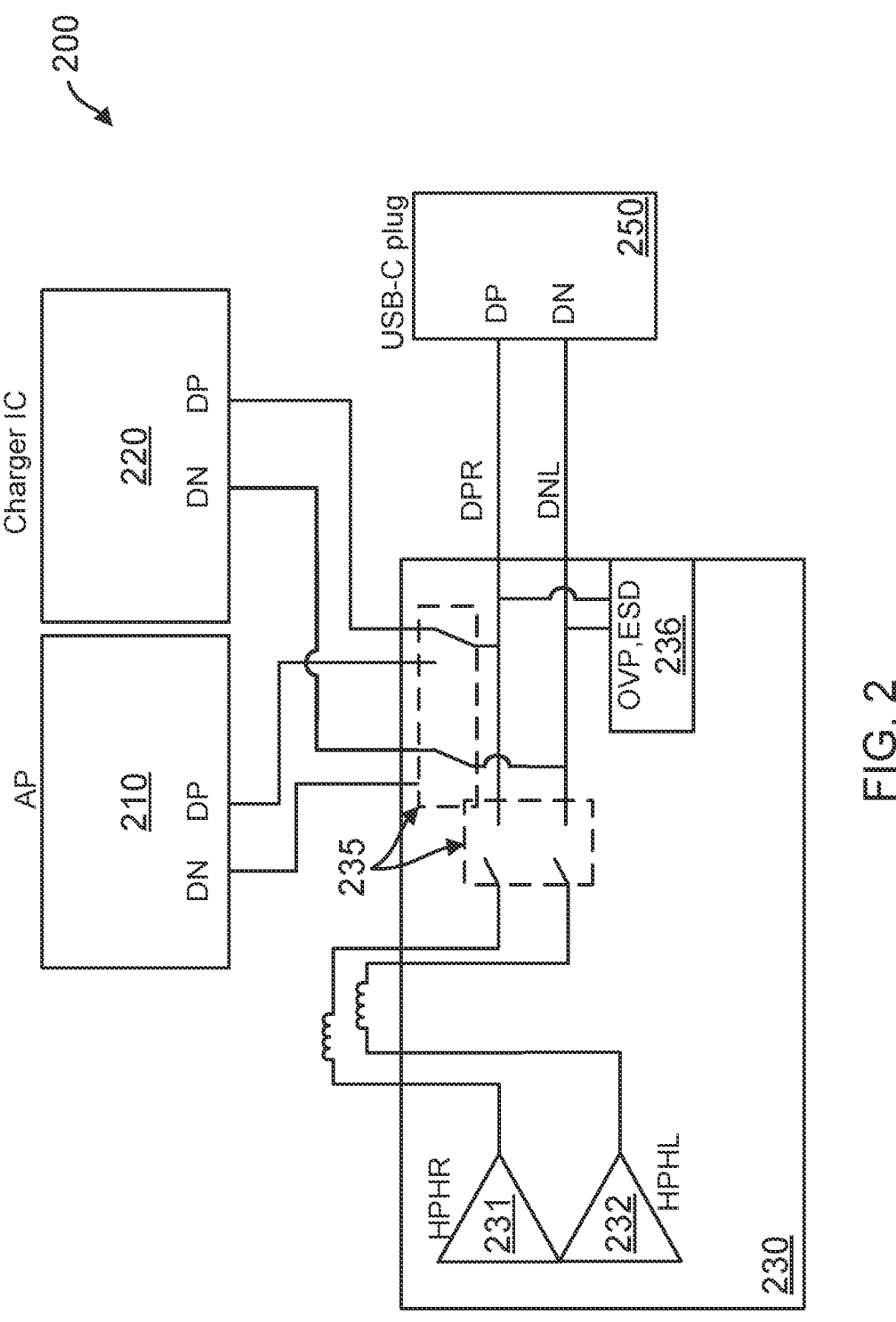
FIG. 2 illustrates an example architecture for multiplexing audio signals, high-speed data signals, and charging, while providing negative voltage transient suppression in a device such as the device of FIG. 1, according to one implementation.

FIG. 2 is an illustration of example hardware architecture 200, which provides more detail as to how some portions of device 100 may be implemented. For instance, architecture 200 includes application processor 210, which may include some or all of the functionality of processor 104 and DSP 120. In some examples, the application processor 210 may be a system on chip (SOC), which includes multiple processor cores, a digital signal processor (DSP), memory, and the like. For instance, one or more of the processor cores may run an operating system having a kernel that provides functionality for, e.g., controlling the multiplexing circuitry 235. The architecture 200 also includes the charger integrated circuit 220, which may include some or all of the functionality of PMIC 124.

Codec chip 230 may provide some or all of the functionality of I/O module 128, and also may include connector 130 to physically interface with plug 250. In this example, plug 250 is a USB-C plug, though the scope of implementations may include any appropriate plug, whether conforming to a standard or otherwise. The codec chip 230 interfaces with both an audio signal path and USB data path. For instance, codec chip 230 receives high-speed data on the DN and DP data lines from the USB-C plug 250. The codec chip 230 may then route that high-speed data to the application processor 210.

Additionally, the codec chip 230 includes audio signal amplifiers 231, 232 for the left channel and right channel, respectively. Analog audio signals may be output to the USB-C plug 250 for use by, e.g., a wired headphone. Of note as well, the USB-C plug 250 may be used for charging so that DC power may be provided from the USB-C plug 250 to the charger IC 220.

To facilitate the shared connections, codec chip 230 includes multiplexing circuitry 235, which in FIG. 2 is illustrated as multiple switches. For instance, when audio signals are being transmitted from the audio signal amplifiers 231, 232 to the USB-C plug 250, switches may be turned on to create an electrical path from the audio signal amplifiers 231, 232 to the USB-C plug 250, whereas other switches may be turned off to isolate the application processor 210 from the audio signal path and to isolate the charger IC 220 from the audio signal path as well. Similarly, when the application processor 210 is transmitting and receiving digital data over the DP and DN pins with the USB-C plug 250, the charger IC 220 and the audio signal amplifiers 231, 232 may be isolated from the USB-C plug by the multiplexing circuitry 235. Also, when the charger IC 220 is receiving DC power over the DN and DP pins of the USB-C plug 250, the multiplexing circuitry 235 may create an electrical connection from the charger IC 220 to the USB-C plug 250 while isolating the application processor 210 and the audio signal amplifiers 231, 232 from the DC charging power. The multiplexing circuitry 235 may be controlled, e.g., by the application processor 210 or some other appropriate hardware or software logic within the architecture 200.

Codec chip 230 also includes overvoltage protection and electrostatic discharge circuit 236 (hereinafter, electrostatic discharge, or ESD, circuit 236), which monitors the signal levels on the lines DPR and DNL and may activate transient voltage suppression, as described in more detail below.

Electrostatic discharge (ESD) conditions may occur at one or more pins of a connector, such as a USB-A or USB-C receptacle, of a device (e.g., device 100). An ESD scheme may be employed, as illustrated in architecture 200, to prevent electrical over stress (EOS) damage to chipset integrated circuits (ICs) having various signal nodes for coupling to the connector pins, such as the DN and DP pins. In this example, the ESD scheme is illustrated by ESD circuit 236. Specifically, the ESD scheme may be implemented at the DPR and DNL pins of codec chip 230, which are configured to electrically contact counterpart DP and DN pins of the USB-C plug 250. In an example ESD scenario, a USB-C cord (not shown), that interfaces with USB-C plug 250, has a buildup of static charge. The static charge may be discharged when connectors of the cord physically create electrical connections with the DN and DP pins of the USB-C plug 250. Without ESD protection, electrical current may surge through the codec chip 230 and the application processor 210 and potentially cause damage.

The ESD scheme of FIG. 2 seeks to minimize the possibility of damage to the codec chip 230 and the application processor 210 by using the ESD protection circuit 236 to detect a negative surge and then to sink current associated with the surge.

Various implementations herein include a feedback loop within the ESD circuit 236, wherein the feedback loop includes a comparator that controls a shunt transistor, and the shunt transistor is disposed in series between a diode and ground.

Figure 3:
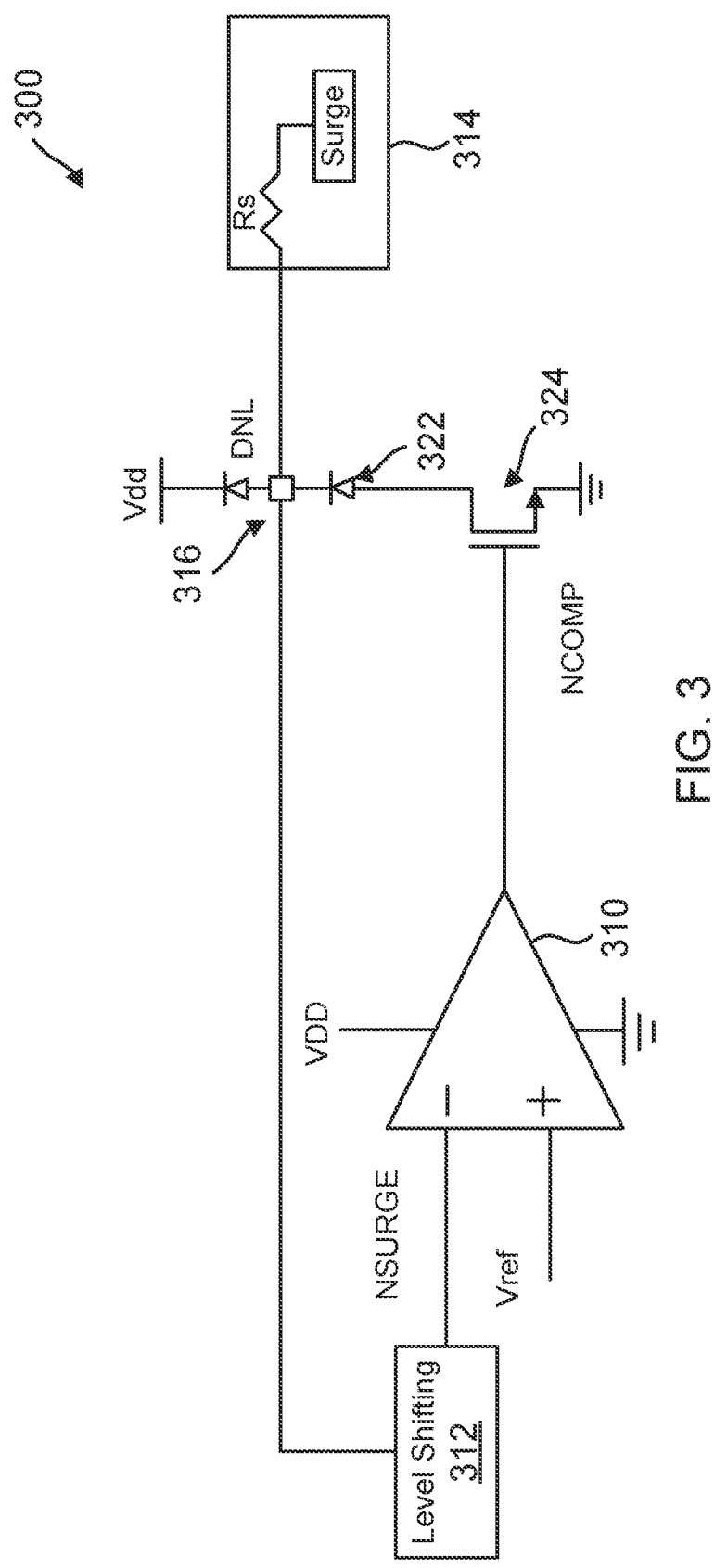
FIG. 3 illustrates an example circuit for negative voltage transient suppression, which may be used in the architecture of FIG. 2, according to one implementation.

FIG. 3 is an illustration of voltage suppression system 300, which may be implemented within the ESD circuit 236 of FIG. 2, according to one implementation. FIG. 3 illustrates voltage suppression at the DNL pin 316, and FIG. 4 (described in more detail below) illustrates that the voltage suppression concept may be scaled to protect more pins.

DNL pin 316 is coupled to diode 322 and shunt transistor 324. Specifically, diode 322 and shunt transistor 324 are placed in series between the ground and DNL pin 316. The gate of shunt transistor 324 is coupled to an output of the comparator 310, where the output is shown as voltage NCOMP. The DNL pin 316 is coupled to the inverting input of comparator 310 through level shifting circuit 312. The non-inverting input of comparator 310 is coupled to reference voltage Vref. The DNL pin 316 is coupled to a DNL wire of FIG. 2 to provide electrical coupling between USB-C plug 250 and the multiplexing circuitry 235.

The comparator 310 is powered by the positive voltage supply Vdd. In this example, the level shifting circuit 312 is used to add a positive direct current (DC) offset to the voltage level at the inverting input of the comparator 310 so that the voltage level experienced at the inverting input is expected to be positive and above the level of the reference voltage Vref during normal operation. When the voltage level at the inverting input drops below the voltage level of Vref, the output of the comparator 310 changes state to turn on the shunt transistor 324. However, the scope of implementations is not limited to a positively-powered comparator with a level shifting circuit. In another example, the comparator 310 may be powered using a negative voltage source, a negative reference voltage, and a normally negative voltage level at the inverting input.

Further in this example, the shunt transistor is a n-channel metal oxide semiconductor (NMOS) transistor that is sized sufficiently to conduct an amount of current that would be expected during a negative surge of event. For instance, if the amount of current during a negative surge event would be expected to be a maximum of 6 A at about a 20 μs pulse, then the shunt transistor 324 may be sized to have a width of about 24 mm. However, the scope of implementations is not limited to any particular surge current amount nor size of shunt transistor 324. Rather, the scope of implementations may scale shunt transistor 324 to accommodate any expected surge event as appropriate.

The diode 322 in this example is a p-n junction diode, which is appropriately sized to conduct an amount of current expected during a negative surge event at DNL pin 316. Diode 322 is designed to have a capacitance that is less than a capacitance associated with shunt transistor 324. In one example, diode 322 may have a capacitance that is about 90 times less than a capacitance associated with shunt transistor 324, even though diode 322 and shunt transistor 324 may be capable of conducting a same amount of current. As a result, the combined series capacitance of diode 322 and shunt transistor 324 is much less than the capacitance associated with the shunt transistor 324 itself. For instance, if the capacitance associated with diode 322 is 1.0× and the capacitance associated with shunt transistor 324 is 90×, then the combined series resistance is approximately 0.99×.

Of course, the scope of implementations is not limited to any capacitance value for the diode 322 and the shunt transistor 324. Rather, relative capacitance value, current-carrying rating, and distortion limits for the high-speed data on the wires DNL and DPR are some of the factors that may be used to select diode 322 and shunt transistor 324.

Surge event 314 produces a current that, in this example, is negative. For instance, if the surge event 314 is associated with a voltage level of −100V and a Rs of 2 Ohms, then the current associated with the surge event 314 may be −50 A. Although not shown herein, the scope of implementations may include an external (e.g., external to the codec chip 230) surge protection circuit that sinks most of the −50 A. The remainder of the surge current may be as much as, e.g., −6 A in some examples. The remainder of the surge current is blocked by the level shifting circuit 312 and the shunt transistor 324, which is turned off. The remainder of the surge current causes a voltage level at the DNL pin 316 to drop. The voltage level at the DNL pin 316 plus the DC offset attributable to level shifting circuit 312 is shown as NSURGE. Once NSURGE drops to be equal to or lower than the voltage level of Vref, the output of the comparator 310 changes to a positive value that is large enough to turn on shunt transistor 324. With shunt transistor 324 turned on, a current from ground, through shunt transistor 324 and diode 322, counteracts the remainder of the surge current. With the remainder of the surge current neutralized, the voltage level at DNL pin 316 rises, thereby changing the output state of the comparator 310 so that the shunt transistor 324 turns off.

The scope of implementations is not limited to the example given above for a voltage or current associated with the surge. Rather, the scope of implementations includes settings for the DC voltage offset of level shifting circuit 312, Vref, and NCOMP appropriate for a given application.

The feedback loop of FIG. 3 is not clocked in this example. In other words, the feedback loop may react as the voltage level of the DNL pin 316 varies. As noted above, during normal operation, the shunt transistor 324 is turned off because its gate-source voltage is zero or less than zero. Therefore, during normal operation, power consumption of the feedback loop of FIG. 3 is expected to be limited to any leakage current attributable to the comparator 310 and shunt transistor 324. As the leakage current is minimized, the power consumption during normal operation of the feedback loop of FIG. 3 is expected to be near zero. Therefore, the implementation of FIG. 3 may provide effective negative transient voltage suppression with minimal or negligible added power use and minimal added capacitance.

Figure 4:
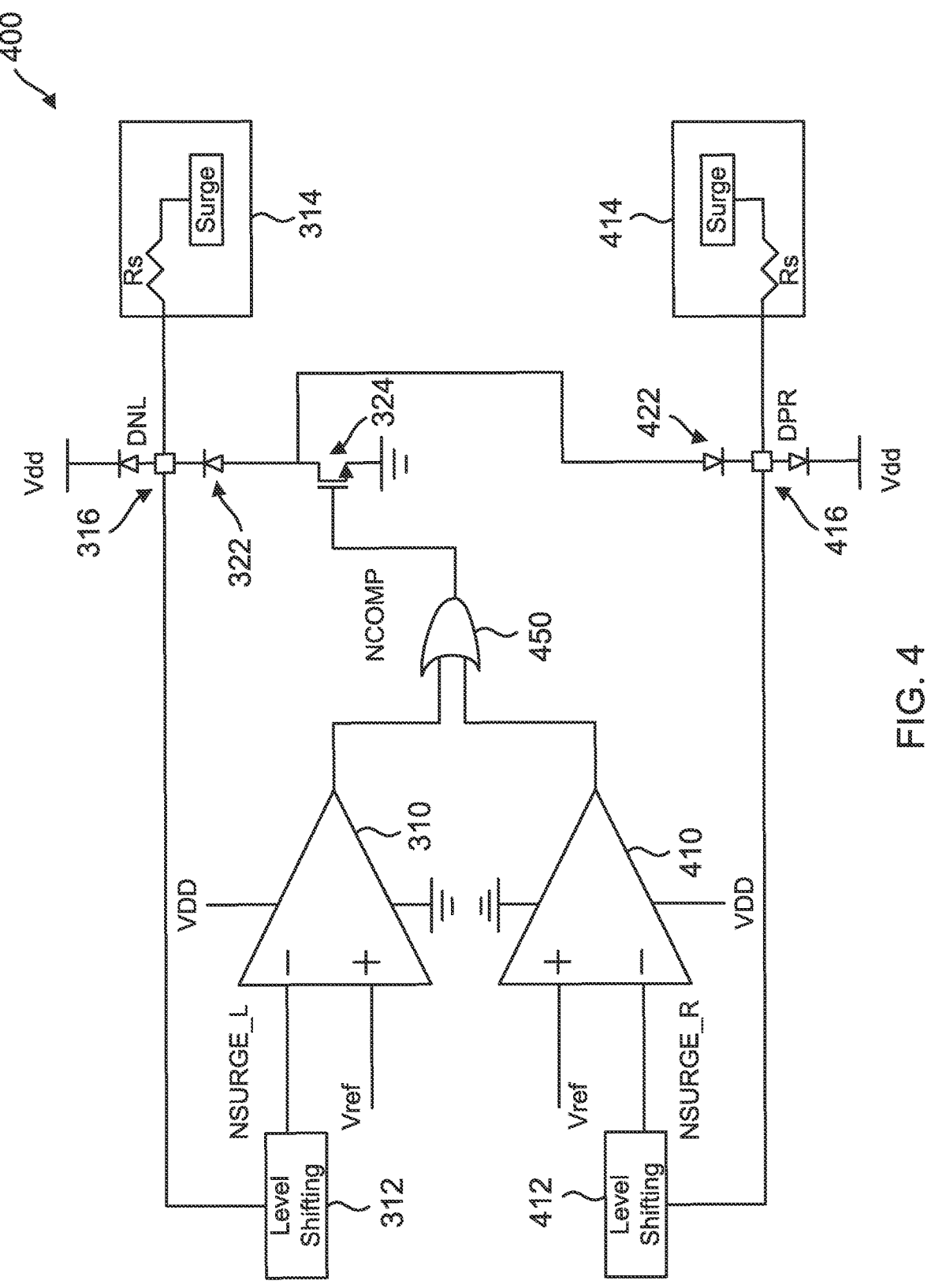
FIG. 4 illustrates an example circuit for negative voltage transient suppression, which may be used in the architecture of FIG. 2, according to one implementation.

FIG. 4 is an illustration of voltage suppression system 400, which may be implemented within the ESD circuit 236 of FIG. 2, according to one implementation. FIG. 4 illustrates the voltage suppression in a stereo system, which has a left channel and a right channel. For instance, the left channel may be associated with the DNL wire of FIG. 2 and the DNL pin 316 of FIG. 3. The right channel may be associated with the DPR wire of FIG. 2 and the DPR pin 416 FIG. 4.

There is a logic gate, or gate 450, disposed between the outputs of comparators 310, 410 and the gate of shunt transistor 324. The logic gate 450 outputs a low voltage (digital zero) unless one or both of its inputs goes high. Therefore, when either comparator 310 changes its output state to a high voltage (digital one) or comparator 410 changes its output state to a high voltage, the logic gate 450 outputs a high voltage at NCOMP (digital one) to turn on shunt transistor 324.

The feedback loop including the comparator 310 operates the same as described above with respect to FIG. 3. That is, when the voltage level at DNL pin 316 drops so that the voltage level seen at the inverting input of comparator 310 is equal to or lower than Vref, the output state of comparator 310 goes high.

The feedback loop including the comparator 410 operates similarly. When the voltage level at DPR pin 416 drops so that the voltage level seen at the inverting input of comparator 410 is equal to or lower than Vref, the output state of comparator 410 goes high. A surge event on the right channel is illustrated by surge 414.

The implementation of FIG. 4 achieves some amount of space savings by sharing shunt transistor 324 between the left channel and the right channel. The diode 422 is coupled at its anode to the drain of shunt transistor 324. In a scenario in which there is a negative surge on the right channel but not on the left channel, the voltage level at DPR pin 416 drops and the voltage level at DNL pin 316 may be around 0 V DC. Once the voltage level (NSURGE_R) at the inverting input of comparator 410 drops to be equal to or lower than the voltage level of Vref, the output state of comparator 410 goes high, which causes the output state of the logic gate 450 to turn high, which turns on shunt transistor 324. Current then flows from ground through diode 422 to DPR pin 416 to neutralize the negative surge.

In a scenario in which there is a negative surge on the left channel but not on the right channel, voltage level at DNL pin 316 drops and the voltage level at DPR pin 416 may be around 0 V DC. Once the voltage level (NSURGE L) at the inverting input of comparator 310 drops to be equal to or lower than the voltage level of Vref, the output state of comparator 310 goes high, which causes the output state of the logic gate 450 to turn high, which turns on shunt transistor 324. Current then flows from ground through diode 322 to DNL pin 316 to neutralize the negative surge.

In a scenario in which there is negative surge on both the right channel and the left channel simultaneously, the output state of logic gate 450 would go high, and the shunt transistor 324 would sink the currents associated with both DNL pin 316 and DPR pin 416.

An example method for operating a negative transient voltage suppression system will now be discussed with reference to the flowchart shown in FIG. 5. The method 500 may be performed by an ESD protection circuit, such as ESD protection circuit 236 illustrated in FIG. 2 as it operates to monitor for, and detect, negative surge events.

At action 510, the method includes receiving a negative current surge at a data and audio combination pin. An example is shown in FIGS. 3 and 4, where data and audio combination pins are illustrated as DNL pin 316 and DPR pin 416. Either or both of the pins 316, 416 may receive a negative current surge during a negative surge event. As explained above, a negative surge event may include a static discharge resulting from plugging in a USB cable, having a static charge buildup, into USB-C plug 250 of FIG. 2.

At action 520, the method includes applying a level-shifted voltage at a first input of the voltage comparator. In this example, the level-shifted voltage is reduced by the negative current surge, and the first input of the voltage comparator is coupled to the data and audio combination pin. In the examples of FIGS. 3 and 4, comparators are illustrated as comparators 310 and 410, and each one of the comparators 310, 410 includes an inverting input coupled to a level shifting circuit 312, 412.

The level-shifted voltage associated with comparator 310 is applied to its inverting input, and the level-shifted voltage associated with comparator 410 is applied to its inverting input. Reference voltage Vref is applied to the noninverting inputs of the comparators 310, 410. Either one or both of the comparators 310, 410 may change its output state to high (digital one) when the voltage level at its inverting input drops below the voltage level of Vref. Otherwise, the output states of the comparators 310, 410 is low (digital zero).

At action 530, the method includes changing an output state of the voltage comparator in response to the level-shifted voltage falling below a reference voltage level at a second input of the voltage comparator. In other words, as explained above, an output state of either voltage comparator 310, 410 may change to high when the voltage level at its inverting input drops below the voltage level of Vref.

Continuing with action 530, the change of output state of a comparator may be associated with a change in output state of a logic gate (as in FIG. 4) or not (as in FIG. 3). In other words, voltage suppression may be applied on a single channel, or a logic gate (e.g., an OR gate) may be used to expand a number of channels on which voltage suppression is applied.

At action 540, the method includes turning on a voltage clamp by the output state of the voltage comparator. For instance, as shown in FIG. 3, a voltage clamp may be implemented by a shunt transistor (e.g., shunt transistor 324), which couples the data and audio combination pin to ground through a diode. Similarly, as shown in FIG. 4, a voltage clamp implemented as a shunt transistor may be shared between multiple channels.

At action 550, the method includes sinking a current associated with the negative current surge through a diode. In the embodiment of FIG. 3, the diode is coupled in series between the data and audio combination pin and the voltage clamp and ground. Current is conducted from ground, through the shunt transistor and diode, to the data and audio combination pin, and to the source of the negative current surge. The current through the diode cancels the current associated with the negative current surge.

The scope of implementations is not limited to the series of actions described with respect to FIG. 5. Rather, an ESD condition, such as a negative surge event, is expected to exist for only a fraction of a second, and once that fraction of a second is over, the voltage level of the data and audio combination pin will have returned to a normal operating range. Therefore, the state of the voltage comparator may change from a digital one to a digital zero, thereby turning off the voltage clamp.

Also, the scope of implementations was described with respect to a NMOS transistor being used as a shunt transistor or voltage clamp. However, the shunt transistor may be implemented as a p-channel metal oxide semiconductor (PMOS) transistor by applying a low voltage to the gate of the PMOS transistor during a negative surge event and applying a high voltage to the gate of the PMOS transistor during normal operation.

Some implementations may be part of an always-on ESD protection scheme. For instance, the voltage comparators 310, 410 may be powered on as long as the reference voltage Vref is provided and as long as the Vdd power supply remains on. Furthermore, the example implementation operates continuously, rather than discreetly, and so does not consume clock resources.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

Implementation examples are described in the following numbered clauses:

1. A wireless communication device comprising:
   an application processor;
   an audio signal amplifier;
   a charging integrated circuit, wherein the application processor, the audio signal amplifier, and the charging integrated circuit are coupled to a set of wires by multiplexing circuitry;
   a first pin on a first wire of the set of wires;
   a data and charging plug coupled to the set of wires through the first pin;
   a first voltage comparator having an inverting input coupled to the first pin, wherein a non-inverting input of the first voltage comparator is coupled to a reference voltage; and
   a first diode and a transistor coupled in series between the first pin and ground, wherein a gate of the transistor is coupled to an output of the first voltage comparator.

2. The wireless communication device of clause 1, further comprising:
   a second diode coupled to a second pin on a second wire of the set of wires, wherein the second diode is coupled to a drain of the transistor, and wherein the first diode is coupled to the drain of the transistor.

3. The wireless communication device of clause 2, further comprising:
   a second voltage comparator having an inverting input coupled to the second pin and a non-inverting input coupled to the reference voltage; and
   a logic gate coupled to the output of the first voltage comparator and to an output of the second voltage comparator, wherein an output of the logic gate is coupled to the gate of the transistor.

4. The wireless communication device of clause 3, wherein the logic gate comprises an OR gate.

5. The wireless communication device of any of clauses 1-4, wherein the first diode comprises a positive-negative (p-n) junction diode.

6. The wireless communication device of any of clauses 1-5, wherein the transistor comprises a n-type metal oxide semiconductor (NMOS) transistor.

7. The wireless communication device of any of clauses 1-6, wherein the data and charging plug comprises a universal serial bus (USB) plug.

8. The wireless communication device of clause 7, further comprising:
   a codec chip that includes the set of wires, the audio signal amplifier, the first pin, and the multiplexing circuitry.

9. The wireless communication device of any of clauses 1-8, further comprising:
   a level shifting circuit coupled between the first pin and the inverting input, wherein the level shifting circuit is configured to add a positive direct current (DC) offset to a voltage level of the first pin.

10. The wireless communication device of any of clauses 1-9, wherein a cathode of the first diode is coupled to the first pin, and wherein an anode of the first diode is coupled to a drain of the transistor, further wherein a source of the transistor is coupled to ground.

11. A method of operating a transient voltage suppression circuit, the method comprising:

receiving a negative current surge at a data and audio combination pin;

applying a level-shifted voltage at a first input of a voltage comparator, wherein the level-shifted voltage is reduced by the negative current surge, further wherein the first input of the voltage comparator is coupled to the data and audio combination pin;

changing an output state of the voltage comparator in response to the level-shifted voltage falling below a reference voltage level at a second input of the voltage comparator;

turning on a voltage clamp by the output state of the voltage comparator; and sinking a current associated with the negative current surge through a diode coupled in series between the data and audio combination pin and the voltage clamp.

12. The method of clause 11, further comprising:

turning off the voltage clamp subsequent to sinking the current.

13. The method of any of clauses 11-12, wherein turning on the voltage clamp comprises applying a positive voltage to a gate of a n-channel metal oxide semiconductor (NMOS) transistor.

14. The method of any of clauses 11-13, wherein sinking the current comprises causing a further current to be conducted from ground, through the diode, and through the data and audio combination pin.

15. The method of any of clauses 11-14, wherein the first input of the voltage comparator is an inverting input, and wherein the second input of the voltage comparator is a non-inverting input.

16. The method of any of clauses 11-15, further comprising:

adding a positive direct current (DC) offset to a voltage level associated with the data and audio combination pin.

17. The method of any of clauses 11-16, wherein receiving the negative current surge is associated with plugging a cable into a wireless device that includes the data and audio combination pin.

18. The method of any of clauses 11-17, wherein turning on the voltage clamp comprises changing a state of a logic gate based upon the output state of the voltage comparator, wherein an output of the logic gate is coupled to a terminal of the voltage clamp.

19. The method of clause 18, wherein the logic gate comprises an OR gate.

20. A wireless communication device comprising:

an application processor;

an audio signal amplifier;

a charging integrated circuit;

means for multiplexing the application processor, the audio signal amplifier, and the charging integrated circuit on a set of wires;

a first pin on a first wire of the set of wires;

a data and charging plug coupled to the set of wires through the first pin; and means for canceling a negative surge at the first pin, wherein the means for canceling includes a first diode and shunt transistor coupled in series between ground and the first pin.

21. The wireless communication device of clause 20, wherein the means for canceling further comprises:

a feedback loop coupling the first pin to an input of a first comparator and coupling an output of the first comparator to a gate of the shunt transistor.

22. The wireless communication device of clause 21, wherein the means for canceling further comprises:

a second diode coupled to a second pin on the set of wires, wherein the second diode is coupled to a drain of the shunt transistor, and wherein the first diode is coupled to the drain of the shunt transistor.

23. The wireless communication device of clause 22, wherein the means for canceling further comprises:

a second comparator coupled to the second pin; and a logic gate coupled to the output of the first comparator and to an output of the second comparator, wherein an output of the logic gate is coupled to the gate of the shunt transistor.

24. The wireless communication device of clause 23, wherein the logic gate comprises an OR gate.

25. The wireless communication device of any of clauses 20-24, wherein the shunt transistor comprises a metal oxide semiconductor field effect transistor (MOSFET), and wherein the first diode comprises a positive-negative (p-n) junction device.

26. A wireless communication device comprising:

a first chip and an audio signal amplifier coupled to a set of wires through multiplexing circuitry;

a first pin on the set of wires, wherein the first pin is coupled to a combination data and audio plug;

a coder decoder (codec) chip including the set of wires and the multiplexing circuitry;

an electrostatic discharge (ESD) protection feedback loop, wherein the ESD protection feedback loop couples the first pin to a first input of a first comparator and couples an output of the first comparator to a gate of a shunt transistor, wherein the shunt transistor is coupled in series between a first diode and ground.

27. The wireless communication device of clause 26, further comprising:

a second diode coupled to a second pin on the set of wires, wherein the second diode is coupled to a drain of the shunt transistor, and wherein the first diode is coupled to the drain of the shunt transistor.

28. The wireless communication device of clause 27, further comprising:

a second voltage comparator coupled to the second pin; and a logic gate coupled to the output of the first comparator and to an output of the second voltage comparator, wherein an output of the logic gate is coupled to the gate of the shunt transistor.

29. The wireless communication device of clause 28, wherein the logic gate comprises an OR gate.

30. The wireless communication device of any of clauses 26-29, wherein the first chip comprises an application processor configured to receive high-speed data over the set of wires and through the multiplexing circuitry.

What is claimed is:

1. A wireless communication device comprising:

an application processor;

an audio signal amplifier;

a charging integrated circuit, wherein the application processor, the audio signal amplifier, and the charging integrated circuit are coupled to a set of wires by multiplexing circuitry;

a first pin on a first wire of the set of wires;

a data and charging plug coupled to the set of wires through the first pin;

a first voltage comparator having a first inverting input coupled to the first pin, wherein a first non-inverting input of the first voltage comparator is coupled to a reference voltage; and a first diode and a transistor coupled in series between the first pin and ground, wherein a gate of the transistor is coupled to an output of the first voltage comparator.

2. The wireless communication device of claim 1, further comprising:

a second diode coupled to a second pin on a second wire of the set of wires, wherein the second diode is coupled to a drain of the transistor, and wherein the first diode is coupled to the drain of the transistor.

3. The wireless communication device of claim 2, further comprising:

a second voltage comparator having a second inverting input coupled to the second pin and a second non-inverting input coupled to the reference voltage; and a logic gate coupled to the output of the first voltage comparator and to an output of the second voltage comparator, wherein an output of the logic gate is coupled to the gate of the transistor.

4. The wireless communication device of claim 3, wherein the logic gate comprises an OR gate.

5. The wireless communication device of claim 1, wherein the first diode comprises a positive-negative (p-n) junction diode.

6. The wireless communication device of claim 1, wherein the transistor comprises a n-type metal oxide semiconductor (NMOS) transistor.

7. The wireless communication device of claim 1, wherein the data and charging plug comprises a universal serial bus (USB) plug.

8. The wireless communication device of claim 7, further comprising:

a codec chip that includes the set of wires, the audio signal amplifier, the first pin, and the multiplexing circuitry.

9. The wireless communication device of claim 1, further comprising:

a level shifting circuit coupled between the first pin and the first inverting input, wherein the level shifting circuit is configured to add a positive direct current (DC) offset to a voltage level of the first pin.

10. The wireless communication device of claim 1, wherein a cathode of the first diode is coupled to the first pin, and wherein an anode of the first diode is coupled to a drain of the transistor, further wherein a source of the transistor is coupled to ground.

11. A wireless communication device comprising:

an application processor;

an audio signal amplifier;

a charging integrated circuit;

means for multiplexing the application processor, the audio signal amplifier, and the charging integrated circuit on a set of wires;

a first pin on a first wire of the set of wires;

a data and charging plug coupled to the set of wires through the first pin; and means for canceling a negative surge at the first pin, wherein the means for canceling includes a first diode and shunt transistor coupled in series between ground and the first pin.

12. The wireless communication device of claim 11, wherein the means for canceling further comprises:

a feedback loop coupling the first pin to an input of a first comparator and coupling an output of the first comparator to a gate of the shunt transistor.

13. The wireless communication device of claim 12, wherein the means for canceling further comprises:

a second diode coupled to a second pin on the set of wires, wherein the second diode is coupled to a drain of the shunt transistor, and wherein the first diode is coupled to the drain of the shunt transistor.

14. The wireless communication device of claim 13, wherein the means for canceling further comprises:

a second comparator coupled to the second pin; and a logic gate coupled to the output of the first comparator and to an output of the second comparator, wherein an output of the logic gate is coupled to the gate of the shunt transistor.

15. The wireless communication device of claim 14, wherein the logic gate comprises an OR gate.

16. The wireless communication device of claim 11, wherein the shunt transistor comprises a metal oxide semiconductor field effect transistor (MOSFET), and wherein the first diode comprises a positive-negative (p-n) junction device.

* * * * *